US010572108B2

(12) United States Patent
Bonchev

(10) Patent No.: US 10,572,108 B2
(45) Date of Patent: Feb. 25, 2020

(54) HIERARCHICAL INVENTORY TREE OPERATION

(71) Applicant: VMware, Inc., Palo Alto, CA (US)

(72) Inventor: Todor Bonchev, Sofia (BG)

(73) Assignee: VMware, Inc., Palo Alto, CA (US)

( * ) Notice: Subject to any disclaimer, the term of this patent is extended or adjusted under 35 U.S.C. 154(b) by 243 days.

(21) Appl. No.: 15/654,961

(22) Filed: Jul. 20, 2017

(65) Prior Publication Data

US 2019/0025991 A1  Jan. 24, 2019

(51) Int. Cl.
*G06F 3/0482* (2013.01)
*G06F 3/0484* (2013.01)
*G06F 3/06* (2006.01)

(52) U.S. Cl.
CPC ........ *G06F 3/0482* (2013.01); *G06F 3/04842* (2013.01); *G06F 3/0605* (2013.01); *G06F 3/0653* (2013.01)

(58) Field of Classification Search
CPC .. G06F 3/0605; G06F 3/0653; G06F 3/04842; G06F 3/0482; G06F 9/5077; G06F 17/30
See application file for complete search history.

(56) References Cited

U.S. PATENT DOCUMENTS

| | | | |
|---|---|---|---|
| 5,414,809 A | 5/1995 | Hogan et al. | |
| 5,923,330 A * | 7/1999 | Tarlton | G06F 16/26 345/419 |
| 6,147,687 A | 11/2000 | Wanderski | |
| 6,681,370 B2 * | 1/2004 | Gounares | G06F 17/227 707/999.201 |
| 6,725,239 B2 * | 4/2004 | Sherman | G06F 16/273 |
| 6,741,998 B2 * | 5/2004 | Ruth | G06F 16/972 707/797 |
| 6,760,721 B1 * | 7/2004 | Chasen | G06F 16/48 |
| 6,795,096 B2 * | 9/2004 | Meaden | G06F 3/0481 715/764 |
| 7,461,077 B1 | 12/2008 | Greenwood | |
| 7,580,938 B1 * | 8/2009 | Pai | G06F 3/0482 |
| 7,808,514 B2 * | 10/2010 | Yu | G06T 3/0043 345/419 |
| 8,250,125 B2 * | 8/2012 | Opaterny | G06F 3/0481 707/829 |
| 8,700,611 B2 | 4/2014 | Kelshikar et al. | |
| 2007/0203920 A1 * | 8/2007 | Bertram | G06F 16/168 |

(Continued)

FOREIGN PATENT DOCUMENTS

WO  WO-2014036073 A2 *  3/2014

*Primary Examiner* — Amy M Levy
(74) *Attorney, Agent, or Firm* — Clayton, McKay & Bailey, PC

(57) ABSTRACT

Hierarchical inventory tree operation can include receiving an indication of an update made to a hierarchical inventory tree. The tree can represent a hierarchical inventory of objects. The indication can include an identification of at least one object affected by the update and an identification of at least one property of the at least one object affected by the update. The update can be particular to a single node of the tree. Hierarchical inventory tree operation can further include flagging the particular node without updating the particular node in the graphical user interface (GUI) responsive to a determination that a portion of the tree including the particular node is not displayed by the GUI.

18 Claims, 7 Drawing Sheets

(56) References Cited

U.S. PATENT DOCUMENTS

| | | | |
|---|---|---|---|
| 2007/0219935 A1* | 9/2007 | Surasinghe | G06Q 10/06 |
| 2009/0106687 A1 | 4/2009 | De Souza et al. | |
| 2010/0194766 A1* | 8/2010 | Nakagawa | G06T 17/005 345/543 |
| 2011/0113365 A1* | 5/2011 | Kimmerly | G06F 9/451 715/806 |
| 2011/0173184 A1* | 7/2011 | Kelshikar | G06F 16/2471 707/722 |
| 2012/0216135 A1* | 8/2012 | Wong | G06F 9/45533 715/764 |
| 2013/0055092 A1* | 2/2013 | Cannon, III | G06F 3/0484 715/738 |
| 2013/0055166 A1* | 2/2013 | Stinger | G06F 3/0481 715/853 |
| 2013/0300747 A1* | 11/2013 | Wong | G06T 11/206 345/440.2 |
| 2014/0282141 A1* | 9/2014 | Sayed | G06F 3/04842 715/765 |
| 2014/0316956 A1* | 10/2014 | Loewen | G06Q 30/04 705/34 |
| 2015/0113118 A1* | 4/2015 | Jain | H04L 41/145 709/224 |
| 2015/0143268 A1* | 5/2015 | Retlich | G05B 23/0216 715/763 |
| 2015/0301861 A1* | 10/2015 | LaChiusa | G06F 11/3072 718/102 |
| 2015/0370763 A1* | 12/2015 | Wang | G06F 17/212 715/235 |
| 2016/0103828 A1* | 4/2016 | Woolf | G06F 16/164 707/705 |
| 2017/0126841 A1* | 5/2017 | Bliss | G06F 3/0481 |
| 2017/0139724 A1* | 5/2017 | Rider | G06Q 10/0633 |
| 2017/0371639 A1* | 12/2017 | Simek | H04L 67/02 |
| 2018/0246942 A1* | 8/2018 | Chen | G06F 16/248 |

* cited by examiner

HIERARCHICAL INVENTORY TREE OPERATION

BACKGROUND

A hierarchical inventory tree can depict hierarchical relationships between objects using nodes and/or child nodes. For example, a hierarchical inventory tree can represent a virtual infrastructure in a datacenter. Such a tree can be displayed in a graphical user interface (GUI) used to manage datacenters, host servers (e.g., hypervisors), clusters, virtual computing instances, data stores, and/or virtual networks inside the datacenter.

In some cases, a datacenter can contain large numbers of hosts and virtual computing instances (e.g., hundreds of thousands of virtual computing instances). The virtual computing instances may be created, deleted, and/or moved from one host, cluster, or datacenter, to another, and the statuses of virtual computing instances, hosts, and/or other entities may change. A corresponding hierarchical inventory tree may be updated to reflect these changes. However, previous approaches to operating hierarchical inventory trees may suffer from slow speeds, especially in cases when the trees include large numbers of nodes and/or child nodes.

DETAILED DESCRIPTION

Figure 1:
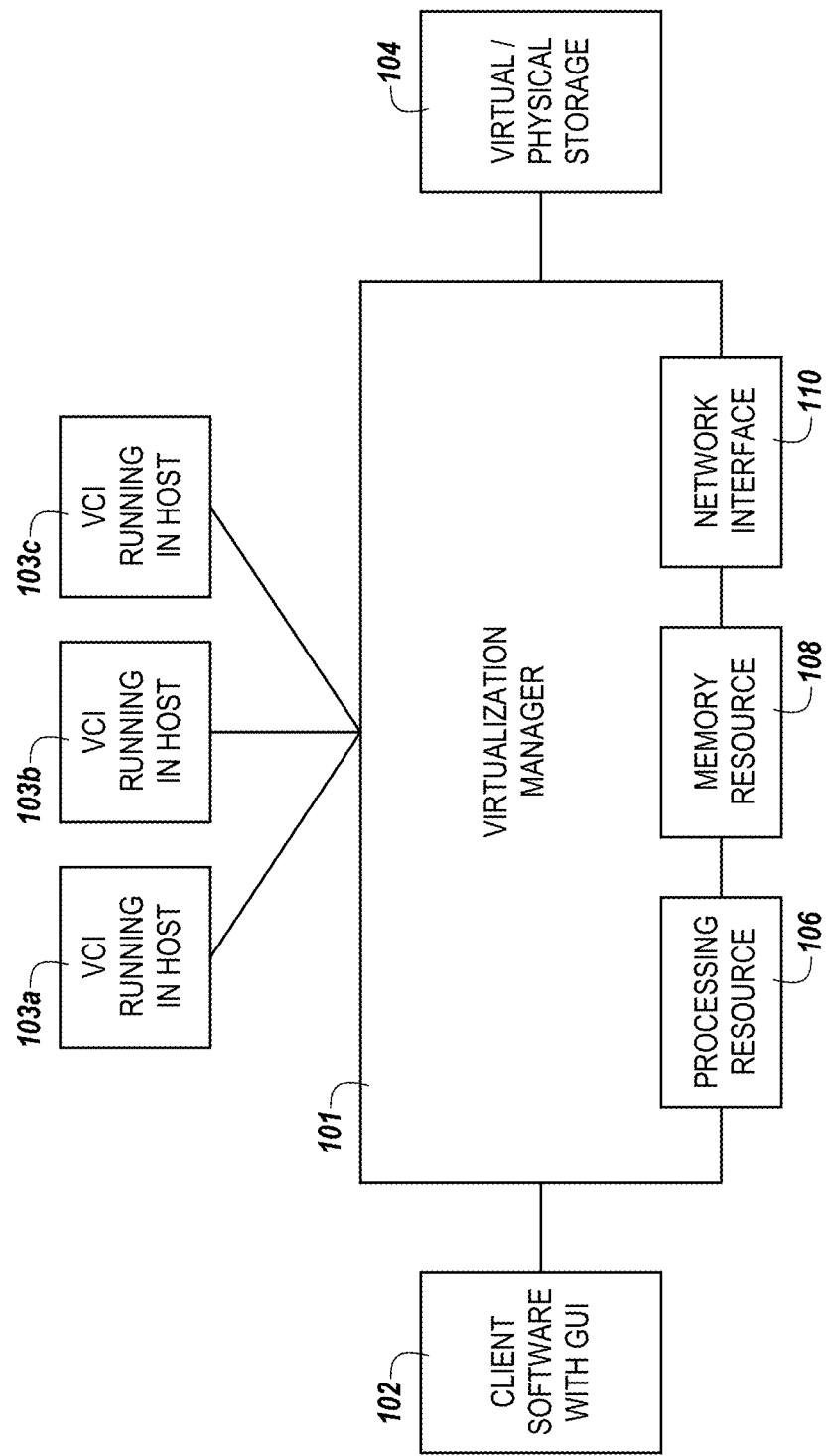
FIG. 1 is a schematic diagram of a system for hierarchical inventory tree operation, in accordance with the present disclosure.

A hierarchical inventory tree can depict hierarchical relationships between objects using nodes and/or child nodes. In some cases, child nodes can have their own child nodes, those nodes can additionally have child nodes, and so on. While the present disclosure makes reference to datacenters, hosts, clusters, and virtual computing instances (VCIs), it is noted that such reference is not to be taken in a limiting sense. Rather, a hierarchical inventory tree (sometimes referred to herein simply as "tree") in accordance with the present disclosure can depict hierarchical relationships between objects. Objects can include items, entities, components, products, etc., and are not intended to be limited to the specific examples discussed herein.

A tree can include nodes and child nodes. In some embodiments, nodes may represent hosts and/or clusters. In some embodiments, child nodes may represent VCIs. A node can be expanded such that its child nodes are enumerated (e.g., displayed via a graphical user interface (GUI)). A node can be collapsed such that its child nodes are not enumerated (e.g., not displayed by a GUI).

Updates to a tree can be made using a GUI. Updates to a tree being viewed using a first GUI can result from changes made to the tree using a second GUI. Updates to a tree can result from human activity. For example, updates can result from adding, deleting, and/or moving a node or child node, or from a modification of a name of a node or child node. Updates can result from non-human activity. For example, updates can result from a change in state (e.g., an operational state) of an object represented by a node or child node.

Updates in a datacenter tree can include updates resulting from a powering on or off of a VCI, a disconnection of a VCI and/or host, an entry into a particular mode (e.g., a maintenance mode) by a VCI and/or host, a name change of a VCI, a conversion of a VCI to a template, an addition of a VCI to a host, a removal of a VCI from a host, a relocation of a VCI from one host to another, etc.

In previous approaches, a query is sent from a client (e.g., a web client) to a target data source to retrieve an update. The results of that query—the update(s)—are then displayed (e.g., immediately displayed) in a tree view in a GUI. The target data source may be a back-end server and/or a database (e.g., an XML database or SQL database), for instance. If, for example, a node having child nodes is moved to a different location in the tree, previous approaches may retrieve and display updates for not only the node itself, but for each of its child nodes. This process may be time-consuming, especially in cases where the quantity of child nodes is great. In the datacenter context, for example, child nodes can number in the hundreds of thousands.

In contrast, embodiments herein can delay updates for nodes (or child nodes) that are not displayed by the GUI. Stated differently, embodiments herein can delay updates for nodes that are not currently visible on the GUI. Nodes that are not displayed can include nodes that are not expanded and nodes that are off screen (e.g., above or below a displayed portion of the tree). In some embodiments, for instance, these not-displayed nodes can be flagged but not immediately updated. If a flagged node subsequently becomes visible as a result of user interaction with the tree (e.g., expansion, collapse, or scrolling) then it can be updated. Accordingly, embodiments herein can process updates only for nodes that the user may actually be interested in—those that are displayed on the user's GUI. Updates for a node can be processed upon a user action indicating a desire to view that node, such as scrolling to that node or expanding its parent node. In some embodiments, if the user is scrolling past nodes at a rate that does not indicate a desire to view those nodes, they may not be updated. Stated differently, a node may be updated responsive to it being displayed by the GUI for a particular period of time (e.g., 200 milliseconds).

The present disclosure is not limited to particular devices or methods, which may vary. The terminology used herein is for the purpose of describing particular embodiments, and is not intended to be limiting. As used herein, the singular forms "a", "an", and "the" include singular and plural referents unless the content clearly dictates otherwise. Furthermore, the words "can" and "may" are used throughout this application in a permissive sense (i.e., having the potential to, being able to), not in a mandatory sense (i.e., must). The term "include," and derivations thereof, mean "including, but not limited to."

As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention, and should not be taken in a limiting sense.

FIG. 1 is a schematic diagram of a system for hierarchical inventory tree operation, in accordance with the present disclosure. As depicted in FIG. 1, a virtualization manager 101 can execute on a server. The term virtualization manager as used herein means management software that provides a mechanism to configure and manage one or more hosts, VCIs, and other components of virtualized infrastructure. The virtualization manager 101 can be connected by a network to a computing device (e.g., a laptop computer) running client software 102 with a GUI. In an example embodiment, the client software 102 is a module of the virtualization manager 101. However, in another example embodiment, the client software 102 merely interfaces with the virtualization manager 101 (e.g., through an application programming interface (API)). Also, as suggested above, the client software 102 might integrate with a web browser (e.g., as a plug-in, or be a web application). The network can be a local area network (LAN), a wide area network (WAN) including the Internet, or some combination of both.

The virtualization manager 101 can include processing resources 106 (e.g., a number of processors), memory resources 108, and/or a network interface 110. Memory resources 108 can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media. For example, the memory resources 108 may comprise primary and/or secondary storage.

The system includes a VCI 103a, a VCI 103b, and a VCI 103c. It is noted that embodiments herein are not limited to a particular number of VCIs. VCIs may include non-virtualized physical hosts, virtual machines (VMs), and/or containers. A VM refers generally to an isolated end user space instance, which can be executed within a virtualized environment. Other technologies aside from hardware virtualization can provide isolated end user space instances may also be referred to as VCIs. The term "VCI" covers these examples and combinations of different types of VCIs, among others. VMs, in some embodiments, operate with their own guest operating systems on a host using resources of the host virtualized by virtualization software (e.g., a hypervisor, virtual machine monitor, etc.). Multiple VCIs can be configured to be in communication with each other in a software defined data center. In such a system, information can be propagated from an end user to at least one of the VCIs in the system, between VCIs in the system, and/or between at least one of the VCIs in the system and a management server. In some embodiments, the virtualization manager 101 can be provided as a VCI. Software defined data centers are dynamic in nature. For example, VCIs and/or various application services, may be created, used, moved, or destroyed within the software defined data center. When VCIs are created, various processes and/or services start running and consuming resources. As used herein, "resources" are physical or virtual components that have a finite availability within a computer or software defined data center. For example, resources include processing resources, memory resources, electrical power, and/or input/output resources.

The virtualization manager 101 can utilize software, hardware, firmware, and/or logic to perform a number of functions. The virtualization manager 101 can include a combination of hardware and program instructions configured to perform a number of functions (e.g., actions). The memory resources 108 can be internal and/or external to the virtualization manager 101 (e.g., the virtualization manager 101 can include internal memory resources and have access to external memory resources). The program instructions (e.g., machine-readable instructions (MRI)) can include instructions stored on the MRM to implement a particular function. The set of MRI can be executable by one or more of the processing resources 106. The memory resources 108 can be coupled to the virtualization manager 101 in a wired and/or wireless manner. For example, the memory resources 108 can be an internal memory, a portable memory, a portable disk, and/or a memory associated with another resource, e.g., enabling MRI to be transferred and/or executed across a network such as the Internet. As used herein, a "module" can include program instructions and/or hardware, but at least includes program instructions.

The memory resources 108 can be non-transitory and can include volatile and/or non-volatile memory. Volatile memory can include memory that depends upon power to store information, such as various types of dynamic random access memory (DRAM) among others. Non-volatile memory can include memory that does not depend upon power to store information. Examples of non-volatile memory can include solid state media such as flash memory, electrically erasable programmable read-only memory (EEPROM), phase change random access memory (PCRAM), magnetic memory, optical memory, and/or a solid state drive (SSD), etc., as well as other types of machine-readable media.

Figure 2:
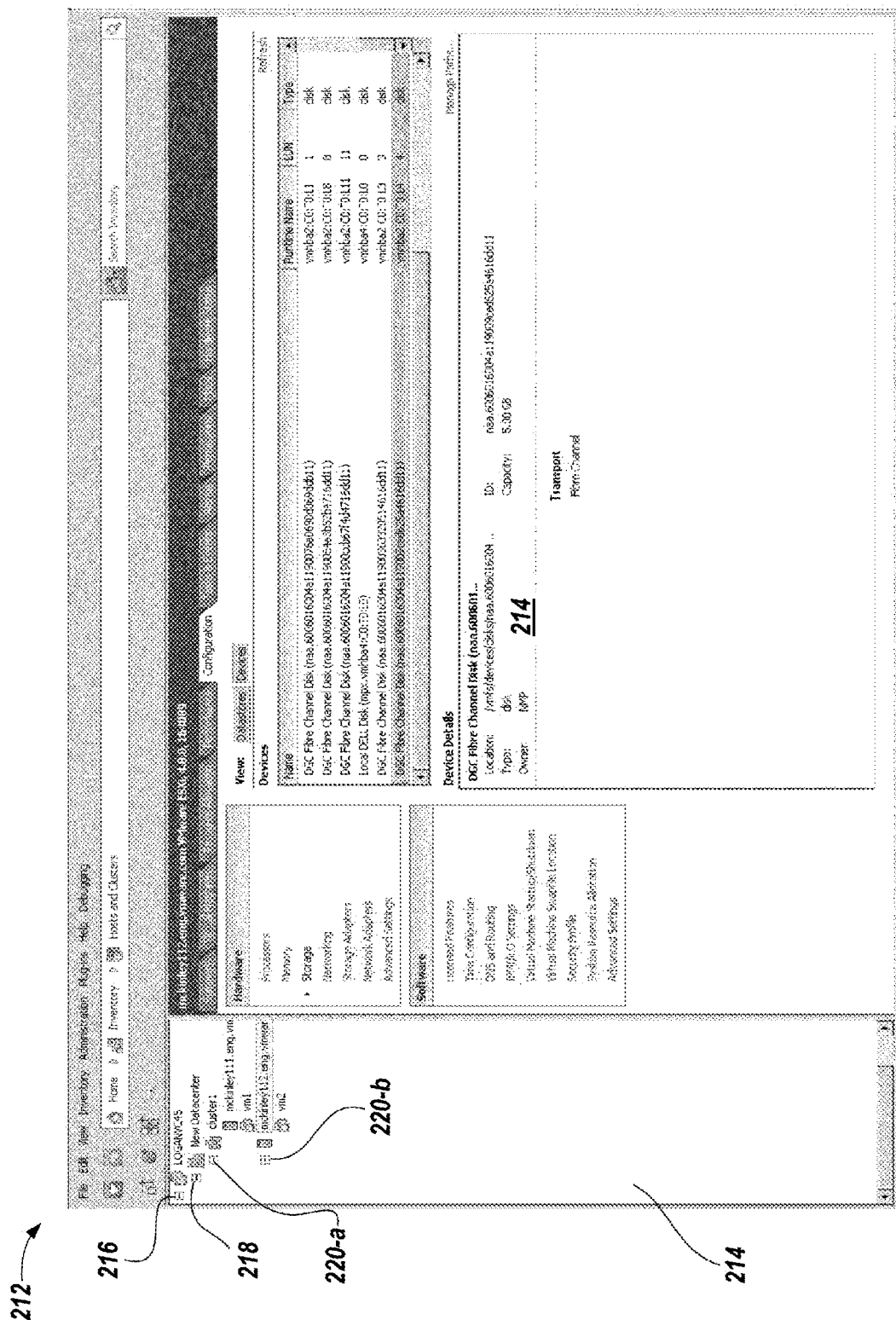
FIG. 2 is a diagram illustrating a GUI displaying a tree according to the present disclosure.

FIG. 2 is a diagram illustrating a GUI displaying a tree according to the present disclosure. The GUI 200 can be displayed by a computing device, for instance. In some embodiments, the GUI 200 can be a website. It is noted that where the term "website" is used herein, "website" is intended to refer to one or more web pages of a website unless otherwise indicated. A tree (or outline) view can be a widget or control in a GUI that allows for the representation of data in a hierarchy (parent-child) relationship. The GUI can support an expand operation which permits the user to see a child branch (or level of a hierarchy) and a collapse operation which hides the child branch.

GUI 212 includes tree view 214 as a child view. A location (e.g., LDGANVC45) is the root node 216 of the tree depicted in the tree view 214. The child node 218 of the root node 212 is a datacenter (e.g., New Datacenter). In turn, the child node 218 had two children of its own, child node 220-a and child node 220-b. The child node 220-a represents a cluster of hosts (e.g., a cluster of hypervisor hosts). The child node 220-b represents a host (e.g., a hypervisor). The tree includes child nodes; representing two virtual machines, e.g., vm1, which is a child of node 220-a, and vm2, which is a child of node 220-b. The child node 220-a also has a host as a child node. In some embodiments, the content of these nodes (e.g., the nodes, child nodes, children of child nodes, etc.) come from different vendors, entities or authors. In some embodiments, tree view 214 might be displayed by a GUI for the client software 102, previously discussed. In some embodiments, tree view 214 might be displayed by a GUI for virtualization manager 101.

Figure 3:
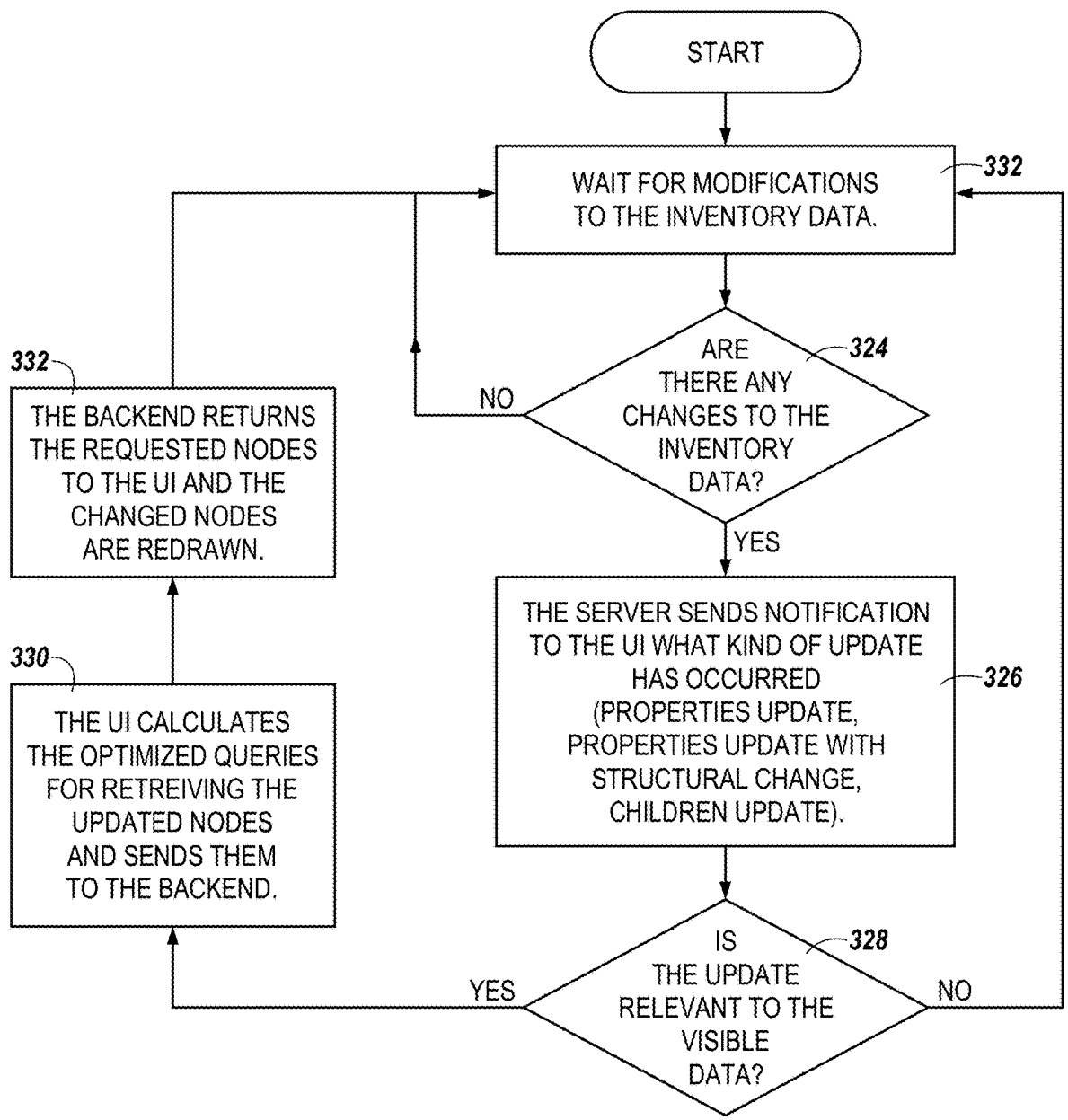
FIG. 3 is a flow chart associated with hierarchical inventory tree operation according to the present disclosure.

FIG. 3 is a flow chart associated with hierarchical inventory tree operation according to the present disclosure. The flow chart illustrated in FIG. 3 can be performed by one or more devices through the execution of executable instructions, for instance. At 322, the instructions can include waiting to receive modifications to the inventory data. As previously discussed, such modifications can be made by a user or can be the result of non-human activity. When it is determined at 324 that there are modifications to the inventory data, the back-end server can send, at 326, a notification to the GUI regarding what modifications were made (e.g., what the update is). As discussed further below, updates can include updates to node properties, updates to node properties that dictate structural changes to the tree, and updates to child nodes.

Figure 4:
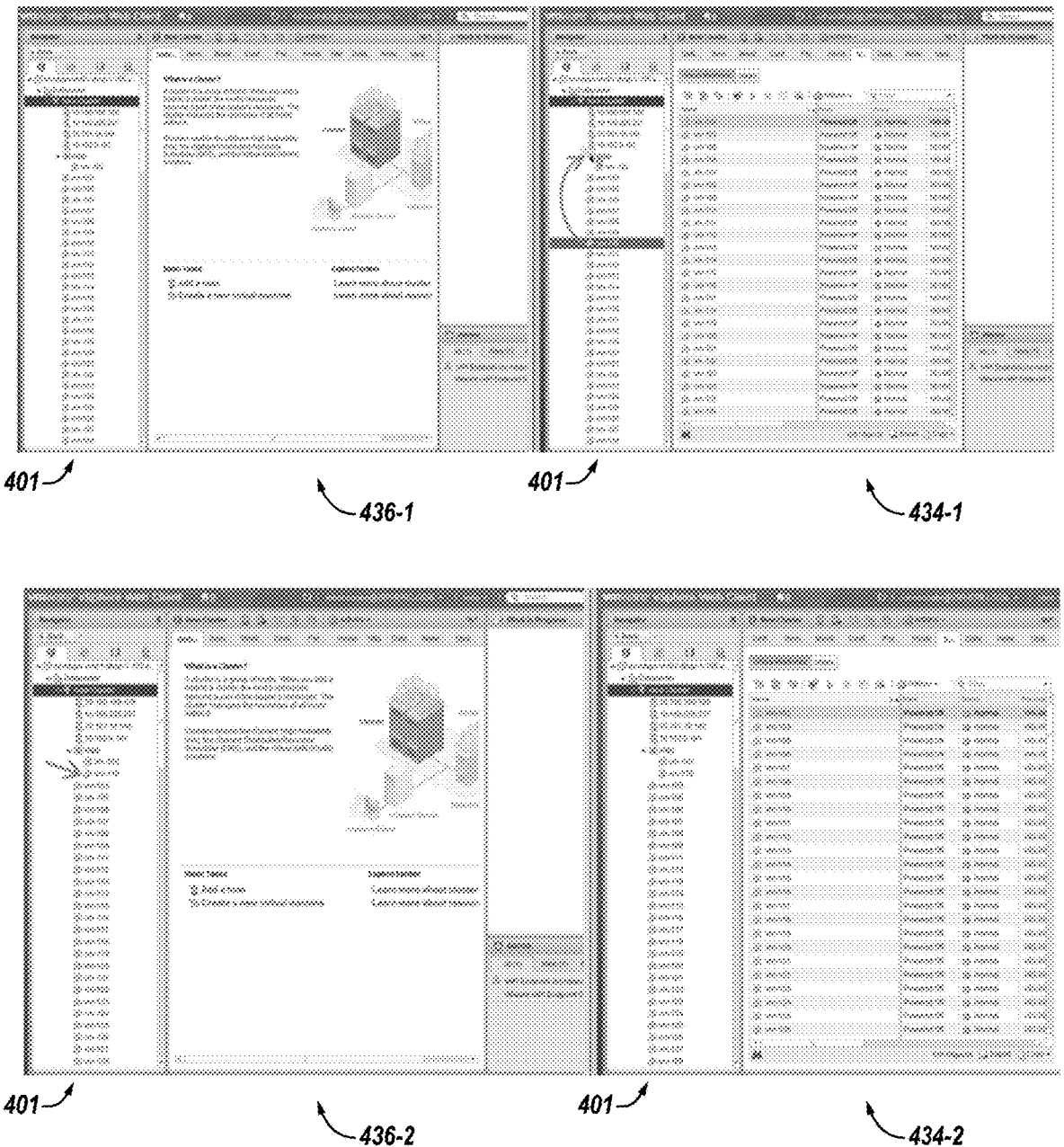
FIG. 4 illustrates a first and a second GUI at two different time instances during hierarchical inventory tree operation according to the present disclosure.

At 328, a determination can be made regarding whether the update is relevant to a node that is displayed by the GUI (e.g., included in the portion of the tree that is being displayed by the GUI). If so, at 330, the GUI can query the back-end server for the updates relevant to the node(s) displayed by the GUI. Upon receiving the query, the back-end server can, at 332, return the requested nodes (e.g., the updated requested nodes) and the tree in the GUI can be modified according to the update. FIG. 4 illustrates an example of how the process described in FIG. 3 may appear played out on two different GUIs.

FIG. 4 illustrates a first and a second GUI at two different time instances during hierarchical inventory tree operation according to the present disclosure. In some embodiments, the two time instances can be separated by a predetermined duration. In some embodiments, the two time instances can be separated by an amount of time taken for an update to be processed. In the example illustrated in FIG. 4, the first GUI, GUI 434, is operated by a user making modifications to a tree 401, and the second GUI, GUI 436, is operated by a user viewing the tree 401. Each of the GUIs 434 and 436 can be displayed by client devices as described herein, for instance. For clarity, the GUI 434 is referred to herein as the "modifying GUI" and the GUI 436 is referred to as the "viewing GUI."

The GUI 434-1 and the GUI 436-1 are the respective GUIs at a first time instance, and the GUI 434-2 and the GUI 436-2 are the respective GUIs at a second time instance. As shown, a modification is made to the tree 401 when a node representing a virtual machine "vm-110" is moved in the GUI 434-1 (e.g., dragged) to a node representing a virtual appliance "vApp," thereby making the node vm-110 a child node of the node vApp. As shown in the GUI 436-2, an update has processed and the modification is displayed in the "viewing" GUI by the second time instance. As previously discussed, the node vApp is displayed by the GUI 434-1 when the modification is made, so the update is reflected on the viewing GUI 422 immediately (e.g., in real time).

In some embodiments, updates may be particular to nodes that are not displayed by the viewing GUI. These may include updates to properties of single nodes or updates to properties of child nodes. As previously discussed, an update to a single node can include an update to an icon associated with the node. An icon can be a graphical identifier of a status such as, for example, whether the object represented by the node is powered on or powered off. An update to a single node can include an update to a label associated with the node. A label can be a textual identifier of a status such as, for example, whether an object represented by the node is disconnected or in a particular mode (e.g., maintenance mode).

If, as illustrated in FIG. 4, the node is displayed in the GUI, the properties affected by the update (e.g., the icon, label etc.) can be requested and the node can be updated. If the node is not in the tree (e.g., not loaded in the tree) embodiments herein may ignore the update. In some embodiments, if the node is not displayed in the GUI (e.g., a portion of the tree including the node is not displayed by the GUI), the node can be flagged and not updated (e.g., not immediately updated).

As previously discussed, updates can be child node updates. Child node updates can include updates to one or more child nodes of an expanded node. Child node updates can include updates to one or more child nodes of an unexpanded node. Child node updates can include updates to displayed child nodes. Child node updates can include updates to child nodes that are not displayed. Embodiments of the present disclosure can treat the updating of child nodes differently depending on what is displayed by the GUI.

In some cases, an update may affect one or more child nodes of a node that is displayed by the GUI and is expanded. Referring back to FIG. 4, for instance, such an update may affect one or more of the VMs (e.g., "vm-103," "vm-105," etc.), which are child nodes of the expanded node "New Cluster." In some embodiments, a particular quantity of the child nodes can be updated responsive to a determination that the node (e.g., the parent node of the child nodes) is expanded and displayed by the GUI. In some embodiments, the particular quantity of the child nodes may be referred to as a "page" of child nodes. In some embodiments, a page of nodes may be a quantity of nodes the GUI is configured to display at once (e.g., without scrolling). In some embodiments, the particular number may be determined based on a resolution of a display device used to provide the GUI, or on display settings (e.g., font size, spacing, etc.). With respect to child nodes that are not included in the particular quantity of updated child nodes, these nodes can be flagged for later updating upon display in a manner such as that previously discussed. Until those nodes are displayed, they may retain whatever previous status and/or information they were associated with by previous update(s).

In some cases, an update may affect one or more child nodes of an unexpanded node. Such a node may have been previously expanded in the GUI and then collapsed, for instance. In some embodiments, the child nodes can be flagged such that they are to be updated upon the next expansion of the parent node. Stated differently, some embodiments can flag each of the child nodes responsive to a determination that the node is displayed by the portion of the GUI and the node is not expanded.

In some cases, an update may affect one or more child nodes of a node that is not displayed by the GUI, but some of its child nodes are displayed by the GUI. Such a scenario may arise, for instance, if a node is located above a displayed portion of its child nodes. Embodiments of the present disclosure can determine a position, in the GUI, of an uppermost displayed node with respect to the first child node of the parent node. Stated differently, embodiments herein can determine an offset of the uppermost displayed child node from the uppermost not-displayed child node. A number (e.g., a page) of the child nodes beginning at the offset can be updated. In accordance with other embodiments, updates can be performed on nodes that are displayed, while updates can be delayed on nodes that are not displayed. Thus, in some embodiments, a page of the plurality of child nodes can be updated responsive to a determination that the node is expanded, the node is not displayed by the GUI, and the page of the plurality of child nodes is displayed by the GUI. With respect to child nodes that are not included in the particular quantity of updated child nodes, these nodes can be flagged for later updating upon display in a manner such as that previously discussed.

In some cases, an update may affect one or more not-displayed child nodes of a node that is expanded but not displayed (e.g., the expanded node and its child nodes are not displayed). In such cases, embodiments herein can determine how many child nodes the parent node includes as a result of the update. In some cases, this quantity of nodes may be the same quantity as it was prior to the update. In other cases, this quantity may be different. The position of other nodes in the tree (e.g., nodes below the parent and its children) may thus be changed or may remain the same. Accordingly, a scroll position in the GUI may be changed. If the quantity of child nodes increases as a result of the update, it should be understood that nodes below the child nodes may be moved down in the tree by an amount reflective of the quantity of children added. If the quantity of child nodes decreases as a result of the update, it should be understood that nodes below the child nodes may be moved up in the tree by an amount reflective of the quantity of children removed. In some cases, child nodes may be repositioned to a place higher in the tree and thus the relative position of nodes below the children may not change. The child nodes can be flagged for later updating, in a manner such as that previously discussed.

In some cases, an update may affect child nodes that have not yet been retrieved (e.g., previously updated), wherein those child nodes are children of a parent node that is not expanded. Embodiments of the present disclosure can include ignoring such updates. Stated differently embodiments herein cannot update not-retrieved child nodes of an unexpanded parent node.

Figure 5:
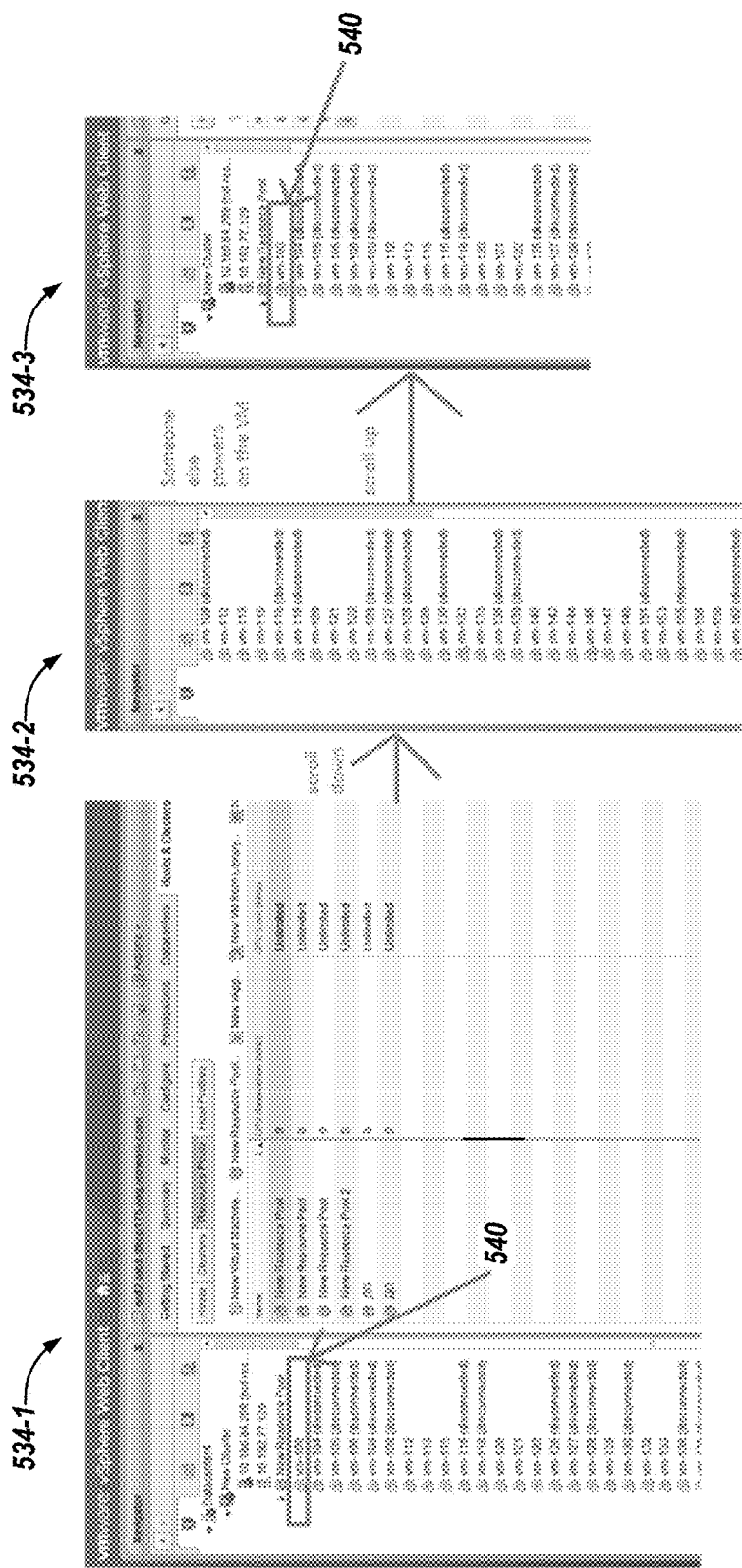
FIG. 5 illustrates a series of GUIs at three different time instances associated with an example VCI powering on according to the present disclosure.

FIG. 5 illustrates a series of GUIs at three different time instances associated with an example VCI powering on according to the present disclosure. In the example illustrated in FIG. 5, the first GUI, GUI 534-1 illustrates an unpowered VCI 540 (named "vm-100"). The second GUI, GUI 534-2 illustrates a plurality of VCIs that are displayed when a user has scrolled down in the tree display. Stated differently, the user has scrolled such that the VCI 540 is not included in the GUI 534-2. In this example, while the VCI 540 is not included in the displayed portion of the tree, it is powered on. The powering-on of the VCI 540 can be carried out by a different user using a different GUI, for instance, though embodiments herein are not so limited. The third GUI, GUI 534-3 illustrates the portion of the tree that includes the VCI 540 after the user has scrolled back to a position in which the VCI 540 is included in the display. As shown in GUI 534-3, an arrow icon associated with the VCI 540 indicates that it has been, or is now, powered on. The display of the indicator arrow may be made in accordance with embodiments herein. That is, the status of the VCI 540 is updated upon its being included (e.g., displayed) in the GUI 534-3.

Figure 6:
FIG. 6 illustrates a first and second GUI at two different time instances associated with an example of renaming a VCI according to the present disclosure.

FIG. 6 illustrates a first and second GUI at two different time instances associated with an example of renaming a VCI according to the present disclosure. In the first GUI 634-1, a VCI 642 is selected in the tree view. At the first time instance, the VCI 642 is named "vm-204." A user has opened a display element 644 configured to allow modifications to be made to a selected VCI (or other component of the tree). As shown, the name of the VCI 642 is being changed to "vm-100." Then, as shown in the second GUI 634-2, the change has been made and the update is visible, as the VCI 642 is shown with its updated name "vm-100." If, for instance, the node "New Resource Pool" was not expanded, the name change update may not be seen until the node "New Resource Pool" is expanded.

Figure 7:
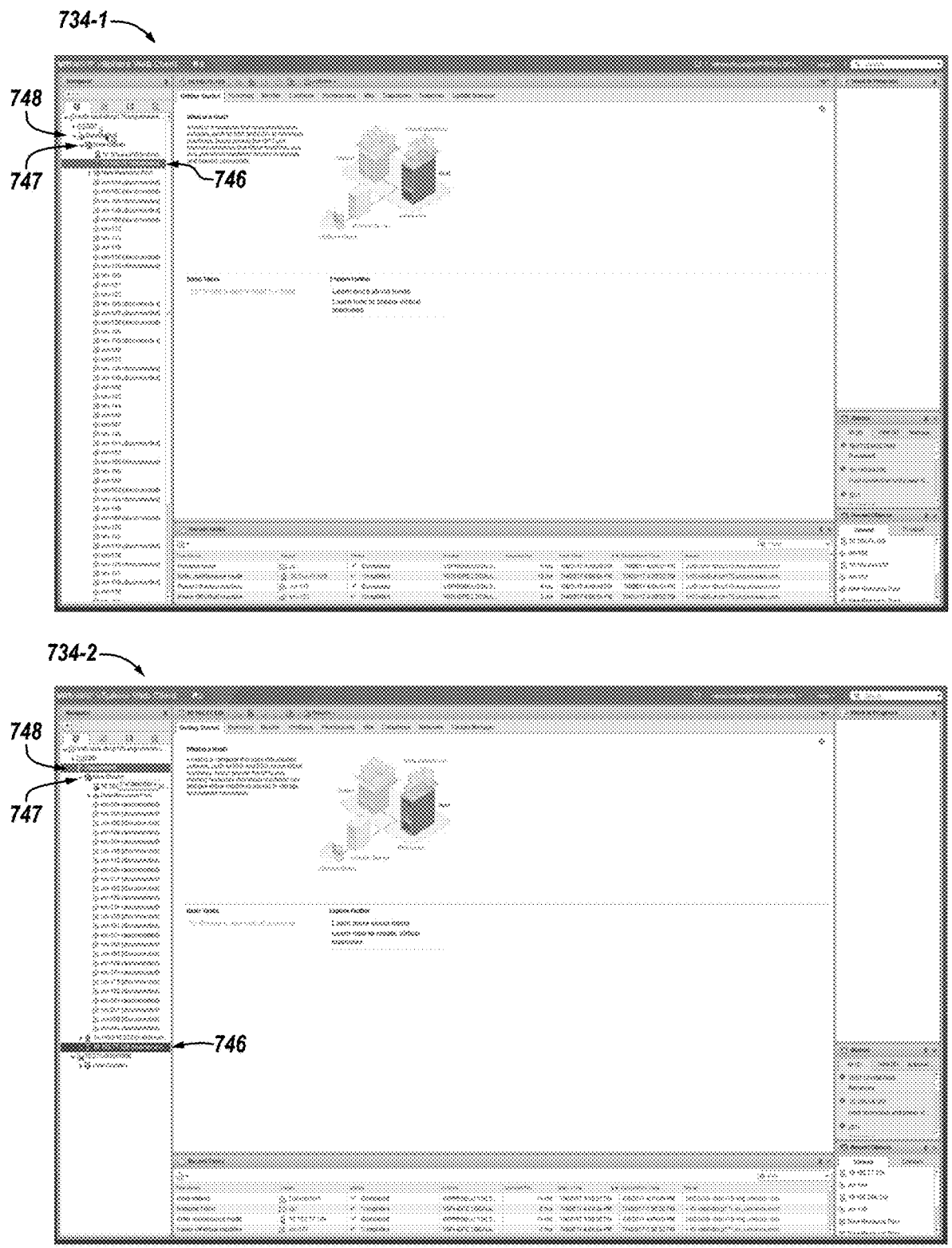
FIG. 7 illustrates a first and second GUI at two different time instances associated with an example of a host being moved outside of a cluster according to the present disclosure.

FIG. 7 illustrates a first and second GUI at two different time instances associated with an example of a host being moved outside of a cluster according to the present disclosure. As shown in the first GUI 734-1, a host 746, named "10.19277.129" is shown as being included in, and thus being a child node of, a cluster 747, named "New Cluster." In the example, using the first GUI 734-1 a user moves the host 746 to another node 748, named "Datacenter," thereby removing it from the cluster 747. As shown in the second GUI 734-2, the host 746 is no longer displayed as a child node of the cluster 747 and has moved further down the tree. Additionally, VCI(s) that are running on the host 746 are removed and no longer displayed in the GUI 734-2. These include, for example, VCIs named "vm-112," "vm-113," and "vm-115," among others.

Although specific embodiments have been described above, these embodiments are not intended to limit the scope of the present disclosure, even where only a single embodiment is described with respect to a particular feature. Examples of features provided in the disclosure are intended to be illustrative rather than restrictive unless stated otherwise. The above description is intended to cover such alternatives, modifications, and equivalents as would be apparent to a person skilled in the art having the benefit of this disclosure.

The scope of the present disclosure includes any feature or combination of features disclosed herein (either explicitly or implicitly), or any generalization thereof, whether or not it mitigates any or all of the problems addressed herein. Various advantages of the present disclosure have been described herein, but embodiments may provide some, all, or none of such advantages, or may provide other advantages.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. A method for hierarchical inventory tree operation, comprising:
 receiving an indication of an update to a hierarchical inventory tree ("tree"), the tree representing a hierarchical inventory of objects, the indication including an identification of at least one object affected by the update and an identification of at least one property of the at least one object affected by the update, and the update being particular to a single node of the tree and inventory data for the single node;
 identifying nodes of a first portion of the tree that defines a current page of nodes displayed by a graphical user interface ("GUI");

determining that the single node is not displayed in the current page of nodes;

flagging the single node such that an implementation of the update in the GUI is delayed at least until a second portion of the tree defines the current page of nodes; and implementing, independent of a selection of the single node, the update to the single node in the GUI based on a determination that the single node is displayed in the current page of nodes with the second portion of the tree for a predetermined minimum period of time, wherein implementing the update includes the GUI requesting the at least one property affected by the update from a back-end server and updating the single node in the GUI according to an updated node returned by the back-end server.

2. The method of claim 1, wherein prior to implementing the update the method further comprises displaying the second portion of the tree including the single node in the GUI based on a scrolling input.

3. The method of claim 1, wherein prior to implementing the update the method further comprises displaying the second portion of the tree including the single node by the GUI based on a collapsing of a different node of the tree.

4. The method of claim 1, further comprising updating the tree by a different GUI.

5. The method of claim 1, further comprising representing the at least one property with an icon associated with the single node.

6. The method of claim 1, further comprising representing the at least one property with a label associated with the particular node.

7. The method of claim 1, wherein the method includes determining that the at least one property dictates a structure of a portion of the tree.

8. A system, comprising:
a processor; and
a memory storing instructions executable by the processor to:
receive an indication of an update to a hierarchical inventory tree ("tree"), the tree representing a hierarchical inventory of objects, the indication including an identification of at least one object affected by the update and an identification of affected properties of the at least one object for the update, and the update being particular to one or more child nodes ("affected child nodes") included in a plurality of child nodes of a node of the tree;
provide a graphical user interface ("GUI") configured to display portions of the tree;
request a selection of the affected properties based on a determination that the node is expanded;
identify nodes of a first portion of the tree that defines a current page of nodes being displayed by the graphical user interface ("GUI");
determine that a first one or more of the affected child nodes ("first affected child node") is displayed in the current page of nodes and a second one or more of the affected child nodes ("second affected child node") is not displayed;
implement a first portion of the update to the first affected child node based on a first corresponding portion of the selection of affected properties;
flag the second affected child node such that an implementation of a respective portion of the update in the GUI is delayed at least at least until a second portion of the tree defines the current page of nodes; and
implement, independent of a selection of the second affected child node, a second portion of the update corresponding to the second affected child node in the GUI based on a determination that the second affected child node is displayed in the current page of nodes with the second portion of the tree for a predetermined minimum period of time, wherein implementing the update includes the GUI requesting the affected properties from a back-end server and updating the second affected child node in the GUI according to an updated node returned by the back-end server.

9. The system of claim 8, wherein the update includes an addition of a child node to the plurality of child nodes.

10. The system of claim 8, wherein the update includes a removal of a child node from the plurality of child nodes.

11. The system of claim 8, wherein the update includes a relocation of a child node from the node to a different node.

12. The system of claim 8, wherein the instructions include an instruction to update a particular quantity of the plurality of child nodes in the tree based on a determination that the node is expanded and the node is displayed by the GUI.

13. The system of claim 8, wherein the instructions include an instruction to implement the first portion of the update based on a determination that:
the node is expanded;
the node is not displayed by the GUI; and
the first affected child node is displayed by the GUI.

14. The system of claim 8, wherein the instructions include an instruction to update a quantity of the plurality of child nodes in the tree based on a determination that:
the node is expanded;
the node is not displayed by the GUI; and
none of the plurality of child nodes are displayed by the GUI.

15. A non-transitory machine-readable medium storing instructions which, when executed by a processor, cause the processor to:
receive an indication of an update to a hierarchical inventory tree ("tree"), the tree representing a hierarchical inventory of objects, the indication including an identification of at least one object affected by the update and an identification of affected properties of the at least one object for the update, and the update being particular to one or more child nodes ("affected child nodes") included in a plurality of child nodes of a node of the tree;
provide a graphical user interface ("GUI") configured to display portions of the tree;
continuously identify nodes of a current portion of the tree displayed by the graphical user interface;
flag each of the affected child nodes in the tree based on a determination that the node is included in the current portion of the tree displayed by the GUI and the node is not expanded;
execute a first update of a first one or more of the affected child nodes ("first affected child node") that is included in the current portion of the tree displayed by the GUI based on a determination that the node is expanded and the node is displayed by the GUI;
execute a second update of a second one or more of the affected child nodes ("second affected child node") based on a determination that the node is expanded, the node is not included the current portion of the tree displayed by the GUI, and the second affected child node is included in the current portion of the tree displayed by the GUI for a predetermined minimum period of time, wherein implementing the second update includes the GUI requesting the affected properties from a back-end server and updating the second affected child node in the GUI according to an updated node returned by the back-end server;

execute a third update of a quantity of the plurality of child nodes in the tree based on the update to the tree and a determination that:
- the node is expanded,
- the node is not displayed by the GUI, and
- none of the plurality of child nodes are displayed by the GUI;

wherein each of the first update, the second update, and the third update is executed independently of a selection of the first affected child node or the second affected child.

16. The medium of claim 15, including instructions to:
execute the first update of the first affected child node that is included in the current portion of the tree displayed by the GUI based on the determination that the node is expanded and the node is displayed by the GUI;

flag a portion of the affected child nodes not included in the first affected child node or the second affected child node; and execute a fourth update of the portion of the affected child nodes based on a determination that the portion of the affected child nodes is subsequently displayed by the GUI.

17. The medium of claim 15, including instructions to execute the third update of the quantity of the plurality of child nodes in the tree based on the update to the tree and the determination that:
- the node is expanded,
- the node is not displayed by the GUI, and
- none of the plurality of child nodes are displayed by the GUI;

flag each child node of the updated quantity of the plurality of child nodes; and execute a fourth update of each child node of the updated quantity of the plurality of child nodes based on a determination that child nodes of the updated quantity of the plurality of child nodes are displayed by the GUI.

18. The medium of claim 15, including instructions not to update the plurality of child nodes based on a determination that the node is not expanded and the affected child nodes have not been previously updated.

* * * * *